Dec. 23, 1958 F. B. BERGER 2,866,190
MICROWAVE FREQUENCY CONTROL
Filed June 1, 1956 2 Sheets-Sheet 1

INVENTOR.
FRANCE B. BERGER
BY
ATTORNEY

United States Patent Office 2,866,190
Patented Dec. 23, 1958

2,866,190

MICROWAVE FREQUENCY CONTROL

France B. Berger, Pleasantville, N. Y., assignor to General Precision Laboratory Incorporated, a corporation of New York Application June 1, 1956, Serial No. 588,840

12 Claims. (Cl. 343—9)

This invention relates to means for automatically controlling the frequency of one or more microwave oscillators.

Aircraft are now frequently provided with microwave equipment for a variety of purposes, such as navigation, fire control, reconnaissance, map making, altitude determination, etc. In some cases, each item has its own microwave oscillator while in other cases a single oscillator may serve several items. Many of these equipments would benefit greatly in accuracy or simplification or both if it were possible to maintain constant the frequency of the microwave oscillator.

Automatic frequency control (AFC) has been applied to microwave apparatus in the past but most systems have used resonant circuits to sense the change in frequency and thereby generate an error signal. For example, a superheterodyne receiver in a search radar may employ a discriminator in the intermediate frequency portion to sense the change in intermediate frequency. The resulting signal can be used to control the transmitter frequency but is more often used to control the local oscillator since all that is required is a constant intermediate frequency. As another example, a resonant cavity can be used to sense a change in microwave frequency directly and suitable circuits can be devised to develop an error signal and control the microwave oscillator. In either case the resonant circuits involved have inherent limitations as to range, sensitivity and stability.

It is an object of the present invention to sense the change in frequency of a microwave source without the use of the usual resonant circuits.

Another object of the invention is to control accurately the frequency of a microwave oscillator.

A further object is to provide a source of microwave energy of substantially constant frequency.

In accordance with the invention, a different approach is made to the problem. An accurately known physical quantity is measured by using the radiation from the source the frequency of which is to be determined or controlled. The measuring apparatus is designed to yield a result which varies with the frequency of the radiation used. Thus the difference between the known value and the measured value is an indication of the frequency of the source. If desired, an error signal may be developed and used to control the frequency of the source. If the physical quantity is not known or if it is varying, a second measuring system, which is independent of the frequency used, may be employed in which case the difference in the two measured values is indicative of the frequency of the source.

For a clearer understanding of the invention reference may be made to the following detailed description and the accompanying drawing in which.

Background

The present invention is especially applicable to airborne installations in which the aircraft carries a great deal of microwave equipment and is, in fact, a by-product of a Doppler navigation system which measures ground speed, drift angle and vertical velocity. Doppler navigation systems are now widely used and most such systems employ linear array antennas for transmitting the required beams of microwave energy. Linear arrays have many advantages in such systems, one of which is that they can be arranged to allow the velocity measurements made to be independent of the frequency of transmission. This property of linear arrays, although known in the past, will be briefly described in order to aid in understanding the present invention.

Figure 1:
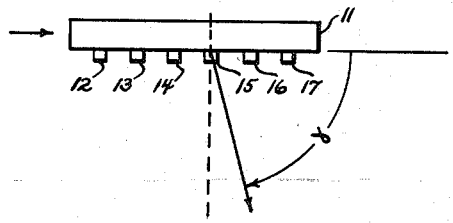
Figure 1 is a schematic diagram of a linear array antenna.

Consider a linear array such as shown in Fig. 1, wherein microwave energy is fed from the left to a waveguide 11 to which are coupled a plurality of individual radiators 12—17 all oriented, or phased, the same way (herein called an in-phase array). Straightforward analysis shows that a major lobe of radiation will be emitted in a direction such that $$\cos \gamma = \frac{\lambda}{\lambda_g} \tag{1}$$

where $\gamma$ is the angle between the array axis and the beam, $\lambda$ is the free space wavelength of the microwave energy, and $\lambda_g$ is the guide wavelength.

If, in Fig. 1, alternate radiators 13, 15 and 17 all be reversed in phase with respect to radiators 12, 14 and 16 (herein called an anti-phase array) a principal beam will be emitted at such an angle that $$\cos \gamma = \frac{\lambda}{\lambda_g} + \frac{\lambda}{2s} \tag{2}$$

where $s$ is the spacing between adjacent radiators.

If a beam of microwave energy be transmitted from a moving body to a stationary reflector and the reflected energy be received on the body, the frequency of the received energy may be expressed as $$f_r = f_t + \frac{2v}{\lambda} \cos \gamma \tag{3}$$

where $f_r$ is the frequency of the received energy, $f_t$ is the frequency of the transmitted energy, $v$ is the velocity of the moving body, $\lambda$ is the free space wavelength of the transmitted energy, and $\gamma$ is the angle between the velocity vector of the moving body and the beam of microwave energy.

Figure 2:
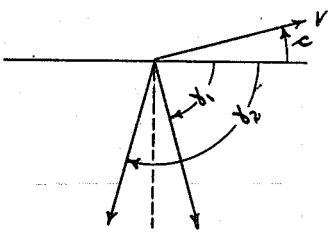
Figure 2 is a diagram showing the beam angles of a particular linear array antenna.

Consider now a special case utilizing the above principles. An aircraft carries a horizontally stabilized platform on which is mounted an antenna system comprising two linear arrays the longitudinal axes of which are maintained aligned with the ground track of the aircraft. One array emits a beam directed downward and forward at an angle $\gamma_1$ with the array axis while the other beam is directed downward and aft at an angle $\gamma_2$ with the array axis, as shown in Fig. 2. The aircraft is assumed to have a vertical as well as a horizontal component of velocity as shown by the climb angle $c$ in Fig. 2.

The frequencies of the energy received by the two antennas after reflection are $$f_f = f_t + \frac{2v}{\lambda} \cos(\gamma_1 + c) \tag{4}$$

$$f_a = f_t + \frac{2v}{\lambda} \cos(\gamma_2 + c) \qquad (5)$$

where $f_t$ and $f_a$ are the frequencies received by the forward and aft looking antennas respectively and $c$ is the climb angle. The difference in frequencies is given by $$f_f - f_a = \frac{2v}{\lambda}[\cos(\gamma_1 + C) - \cos(\gamma_2 + C)] \qquad (6)$$

Consider now the case where one of the beams of Fig. 2 is formed by an in-phase linear array while the other beam is formed by an anti-phase linear array, the two arrays being designed so that $\gamma_2$ is equal to $\pi - \gamma_1$ at the design frequency. Analysis of Equation 6 for this case shows that:

(1) The difference in returned frequencies is proportional to the horizontal component of aircraft velocity.

(2) In level flight, the difference in returned frequencies is independent of the transmitted frequency.

(3) During climb or dive ($c \neq 0$) the difference in returned frequencies is dependent upon the transmitted frequency.

The complete analysis yielding the above results includes not only the factors of Equations 1, 2 and 6 but also takes into account the situation where the beams are not aligned with the ground track. This analysis, although straightforward, is rather complex. However, the reasonableness of the results can be seen by making some simplifications.

If $\gamma_2 = \pi - \gamma_1$, Equation 6 reduces to $$f_f - f_a = \frac{4V}{\lambda} \cos \gamma_1 \cos c \qquad (7)$$

which shows that the difference in frequencies is proportional to the horizontal component of aircraft velocity.

If $c = 0$, and the values of $\cos \gamma_1$ and $\cos \gamma_2$ from Equations 1 and 2 are substituted in Equation 6, the result is $$f_f - f_a = \frac{V}{s} \qquad (8)$$

which shows that in level flight the difference in frequencies is independent of the transmitted frequency.

Vertical velocity may be measured with two beams arranged as in Fig. 2 by coherently demodulating each return signal separately and subtracting the resulting frequencies. Coherent demodulation yields, in each case, the Doppler shift in frequency which is represented by the second terms in Equations 4 and 5, and their difference is represented by $$d_f - d_a = \frac{2V}{\lambda}[\cos(\gamma_1 + c) - \cos(\gamma_2 + C)] \qquad (9)$$

If $\gamma_2 = \pi - \gamma_1$, Equation 9 reduces to $$d_f - d_a = -\frac{4V}{\lambda} \sin \gamma_1 \sin c \qquad (10)$$

from which it is seen that the difference between the Doppler shifts is proportional to the vertical component of the aircraft's velocity.

Equation 9 can be analyzed for the case in which one beam is formed by an in-phase array and the other is formed by an anti-phase array by considering the beam angles as defined in Equations 1 and 2 and by considering the fact that, in a rectangular waveguide, $$\frac{\lambda}{\lambda_g} = \sqrt{1 - \left(\frac{\lambda}{2a}\right)^2}$$

where $a$ is the longer inside dimension. Such an analysis shows that the measurement of vertical velocity is dependent upon the frequency of transmission.

If each beam is formed by an in-phase array, one fed from the forward end and one from the aft end of the aircraft, a similar analysis of Equation 9 shows that the measurement of vertical velocity is independent of the frequency of transmission.

Present invention

Figure 4:
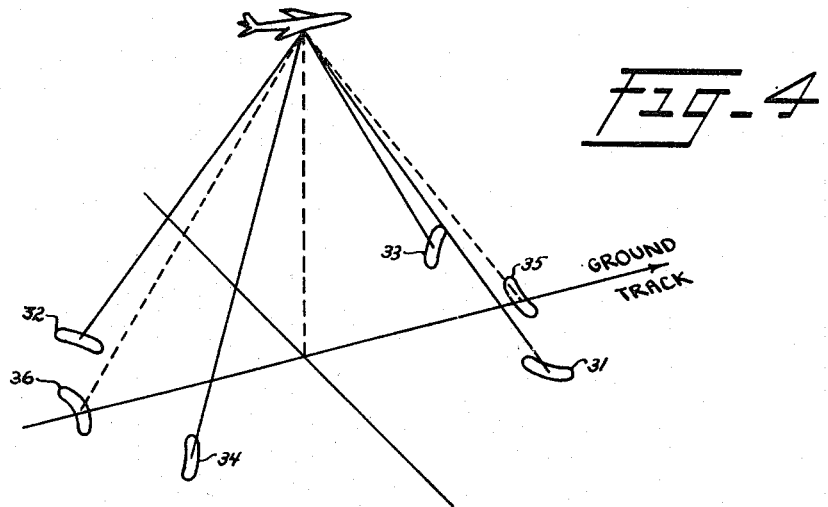
Figure 4 is a diagram showing the configuration of beams emitted by the apparatus of Figure 3.
Figure 3:
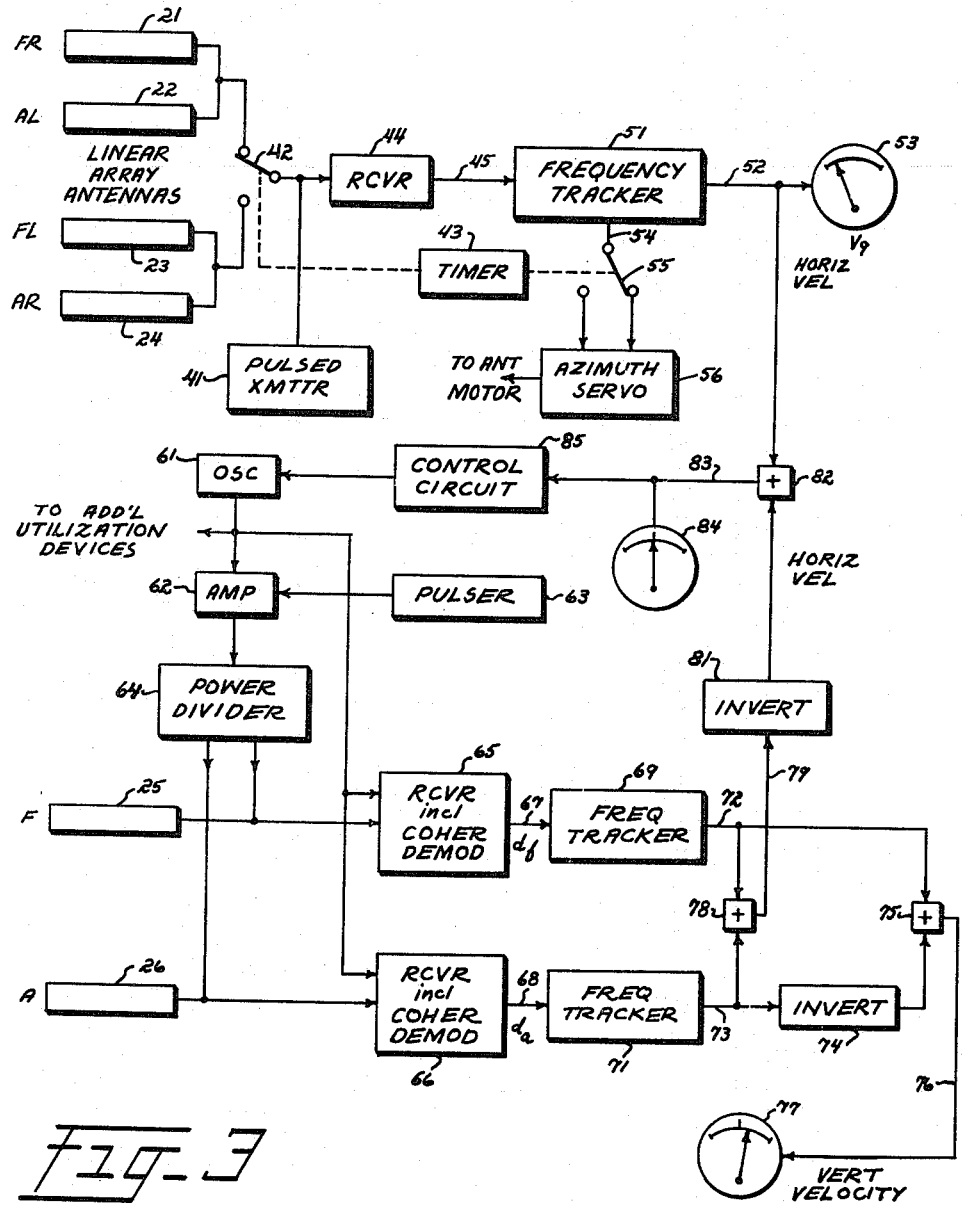
Figure 3 is a block diagram of a preferred embodiment of the invention.

The specific embodiment of the present invention being described for illustrative purposes cooperates with the electronic systems of an aircraft equipped with a Doppler apparatus for determining the velocity vector of the aircraft and also equipped with other microwave apparatus such as altimeters, fire control equipment, and mapping and reconnaissance radar systems. As shown in Fig. 3, the Doppler system employs four linear arrays 21, 22, 23 and 24 in the drift angle and horizontal velocity circuit and two linear arrays 25 and 26 in the vertical velocity circuit. The arrays 21 and 22 constitute one pair, the array 21 being an anti-phase array having its beam directed forward and to the right while the array 22 is an in-phase array having its beam directed aft and to the left, thereby illuminating the ground areas 31 and 32 respectively, as shown in Fig. 4. The arrays 23 and 24 constitute another pair, the array 23 being an anti-phase array illuminating the area 33 while the array 24 is an in-phase array which illuminates the area 34. The arrays 25 and 26 are both in-phase arrays fed from opposite ends, which illuminate areas 35 and 36 respectively on the ground track of the aircraft. All of the arrays are mounted parallel with each other on a horizontally stabilized platform which is rotated in azimuth so as to maintain the axes of the arrays aligned with the ground track of the aircraft.

The arrays 21, 22, 23 and 24 with their associated equipment constitute a Doppler system for measuring ground speed and drift angle. The details of such a system are not a part of the present invention and therefore will be but briefly described herein. A pulsed microwave transmitter 41 generates microwaves which are conducted alternately to the forward right-aft left pair of antennas and to the forward left-aft right pair. Switching is done with a microwave switch 42 operated by a timer 43 the frequency of which is much lower than the pulse repetition frequency of the transmitter. For example, with a pulse repetition frequency of about 50 kilocycles per second, a beam switching frequency of about one cycle per second has been found to be satisfactory.

With the switch 42 in the position shown in the drawing, the antennas 21 and 22 illuminate the areas 31 and 32, as previously explained, and pulse echoes are received after reflection. It will be understood that a suitable duplexing arrangement is required to keep the transmitter energy out of the receiver but since such an arrangement is conventional it has been omitted from the drawing. The echoes from antennas 21 and 22 pass through a common channel to the receiver 44 where they are mixed with the signal from a local oscillator which may, for example, be displaced in frequency by 30 megacycles from the transmitter frequency. The resulting signal consists of a 30 megacycle carrier with sidebands equal to the difference in the frequency of the energy received by the antennas 21 and 22. After amplification and detection, a voltage having this difference frequency appears on conductor 45.

Figure 5:
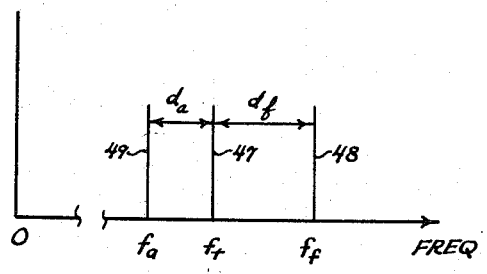
Figure 5 is a diagram showing the relationship of returned frequencies to transmitted frequencies.

The relation of the frequency on conductor 45 to the transmitter frequency can be seen in Fig. 5, wherein the line 47 represents the transmitter frequency. If the aircraft has a forward velocity, the energy received by the forward looking antenna 21 will be Doppler shifted upward and amount designated $d_f$, as represented by the line 48, while the energy received by the aft looking antenna 22 will be Doppler shifted downward an amount designated $d_a$, as represented by the line 49. Assuming that the two looking angles are the same, the two Doppler shifts $d_f$ and $d_a$ would be equal in the absence of any vertical velocity. Figure 5, however, shows the condition when the aircraft has both a horizontal component of velocity and a vertical component downward. The latter component tends to increase the frequency of the energy received by both antennas. The energy in conductor 45 has a frequency equal to the difference in returned frequencies, or $d_f + d_a$, which frequency is proportional to the horizontal component of the aircraft's velocity. In practical systems in use today this frequency usually is in the range from one to twenty kilocycles.

The signal on conductor 45 is not a single frequency but, due to the nature of the reflection process, is a band or spectrum of frequencies. A frequency tracker 51 is employed to derive a signal indicative of the center of this spectrum and may, for example, be similar to that described in the copending application of Gray, Newsom and Crane, Serial No. 314,306, filed October 11, 1952; or the copending application of Gray and Newsom, Serial No. 368,792, filed July 7, 1953, for Automatic Signal Frequency Tracker, or the copending application of Newsom and Huntington, Serial No. 371,608, filed July 3, 1953.

Frequency trackers such as those described in the above applications may provide outputs in various forms, such as an alternating current the frequency of which is equal or proportional to the input frequency, an alternating voltage the magnitude of which is proportional to the input frequency or a unidirectional voltage the magnitude of which is proportional to the input frequency. The latter has been chosen for illustrative purposes herein and the output of the frequency tracker 51 appears on conductor 52 as a unidirectional voltage proportional to the input frequency. The output is smoothed over a period of time which is long compared to the frequency of the timer 43 so that the output is the average of the difference in Doppler shifts of the forward right—aft left pair and the forward left—aft right pair, or $$\frac{(d_{fr}+d_{al})+(d_{fl}+d_{ar})}{2}$$

This voltage is, of course, proportional to ground speed, $v_g$, and is displayed on an indicator 53.

The receiver 44 receives signals alternately from the forward right-aft left and the forward left-aft right pairs of antennas because of the cyclic operation of switch 42. When the antenna assembly is aligned with the ground track the two signals on conductor 45, are, of course, equal but when the assembly is not so aligned the frequencies of the two signals are different and this difference can be used to maintain the assembly aligned with the ground track. The frequency tracker 51 derives direct current voltage indicative of the two Doppler signals which, as previously explained, are smoothed, or averaged, before appearing on conductor 52. To obtain the error signal for aligning the antenna, a conductor 54 extracts the signals before they are smoothed and applies them through the switch 55 also operated by the timer 43 to an azimuth servomechanism 56 which generates a signal for operating a motor to servo the antenna assembly to the ground track.

The antennas 25 and 26 and their associated equipment constitute a Doppler system primarily for measuring the vertical component of the aircraft's velocity but also for deriving a signal useful for frequency control purposes. Microwave energy from an oscillator 61 is fed to a power amplifier 62 which is modulated by a pulser 63 so as to deliver pulses of microwave energy which pass through a power divider 64 to the antennas 25 and 26. The necessary duplexing items have been omitted from the drawing but may be of conventional design. After reflection from the ground, pulse echoes are received by the antennas 25 and 26 and passed to separate receivers 65 and 66 where they are coherently demodulated with the aid of a reference signal from the oscillator 61 so as to yield signals on conductors 67 and 68 the frequencies of which are the Doppler shifts in frequency. These shifts are depicted in Fig. 5 as $d_t$ and $d_a$ respectively. Frequency trackers 69 and 71, which may be similar to the tracker 51, accept these two spectrums of frequencies and derive unidirectional voltages on conductors 72 and 73 proportional to $d_t$ and $d_a$ respectively.

It will be recalled from the previous discussion that the difference between the Doppler shifts $d_t$ and $d_a$ is proportional to vertical velocity. The voltages on conductors 72 and 73 have the same polarity so that in order to distinguish between climb and dive the voltage of conductor 73 is reversed in polarity by means of an inverter 74 and the result added to the voltage of conductor 72 by an adder 75 thereby yielding an output on conductor 76 indicative of both the magnitude and direction of the aircraft's vertical velocity. This output may be used to operate various control or indicating devices such as the meter 77.

Horizontal velocity may be derived by adding the voltages on conductors 72 and 73 with an adder 78 to derive a voltage on conductor 79 proportional to the sum of the Doppler shifts $d_t$ and $d_a$.

It will be recalled that the antennas 25 and 26 are both in-phase arrays fed from opposite ends so that the difference between the two Doppler shifts, and therefore the determination of vertical velocity is independent of the transmitted frequency. However, the sum of the Doppler shifts, and therefore the voltage on conductor 79, will vary with the frequency of transmission. If the frequency of oscillator 61 remained constant at the design frequency of the equipment, the voltage on conductor 79 would be a true indication of horizontal velocity. Therefore, the deviation in the voltage on conductor 79 from the true indication of horizontal velocity is an indication of the deviation in frequency of the oscillator 61.

It will be recalled from the previous discussion that the arrays, 21, 22, 23 and 24, consisting as they do of in-phase anti-phase pairs, enable the voltage on conductor 52 to be a true indication of horizontal velocity independent of variations in frequency of the transmitter 41. Therefore a comparison of the voltages on conductors 79 and 52 will yield a signal indicative of the deviation in frequency of the oscillator 61. To facilitate the comparison, the voltage of conductor 79 is reversed in polarity by an inverter 81 so as to be of opposite polarity to the voltage of conductor 52. The two voltages may then be added algebraically in an adding circuit 82. The potential of the output conductor 83 will therefore be zero when the oscillator 61 is operating at its design frequency but will rise or fall as the oscillator 61 varies in frequency. A zero center meter 84 connected to conductor 83 can therefore be calibrated to indicate the frequency of oscillator 61, the center position being the design frequency.

The potential of conductor 83 may also be passed to a control circuit 85 which in turn maintains the frequency of oscillator 61 constant at the design frequency. The actual control of oscillator 61 may be accomplished in a variety of well-known ways. For example, if the oscillator is a klystron, control may be by altering the resonant frequency of the cavity or by adjusting the repeller voltage. Some magnetrons are provided with mechanical tuning arrangements for adjusting the resonant frequency of the cavity while others have special control electrodes the voltage of which controls the frequency of oscillation.

The output of oscillator 61 may be used by any number of additional devices simply by providing suitable amplifiers to be driven by the oscillator 61.

Although a specific embodiment has been described as illustrative, many modifications may be made within the scope of the invention. For example, vertical velocity in a frequency dependent form could be derived from the arrays 21—24 by coherently demodulating each return signal. This signal could be compared with the true vertical velocity obtained from arrays 25 and 26 in order to adjust the frequency of the transmitter 41. As another example, a signal microwave oscillator could be used for all six of the arrays shown in Fig. 3. Many other modifications will occur to those skilled in the art.

What is claimed is:

1. Apparatus for measuring the frequency of a source of radiant energy comprising, means employing said radiant energy for measuring the magnitude of a known physical quantity, said means giving a measurement which varies with both the magnitude of said quantity and the frequency of said source, and means for comparing the measured value with the known value of said physical quantity.

2. Apparatus for measuring the frequency of a source of radiant energy comprising means for generating a first analog quantity indicative of the magnitude of a physical quantity, means for generating a second analog quantity which is a function of both the magnitude of said physical quantity and the frequency of said source, and means for comparing said first and second analog quantities.

3. Apparatus for sensing the deviation in frequency, from a preselected value, of radiant energy comprising, first means for measuring a physical quantity, second means employing radiant energy for measuring the same physical quantity, said second means yielding a measurement which varies with both the magnitude of said quantity and the frequency of the radiant energy, and means for comparing the two measured values of said physical quantity.

4. Apparatus for sensing the deviation in frequency of radiant energy from a preselected value comprising, first and second means each employing radiant energy for measuring the magnitude of a physical quantity, the measurement obtained by said first means being independent of the frequency of the radiant energy employed while the measurement obtained by said second means depends upon the frequency of the radiant energy employed, and means for comparing the two measured values.

5. Apparatus for controlling the frequency of a source of radiant energy comprising, means for generating a first analog quantity indicative of the magnitude of a physical quantity, means for generating a second analog quantity which is a function of both the magnitude of said physical quantity and the frequency of said source of radiant energy, and means responsive to the difference between said first and second analog quantities for controlling the frequency of said source of radiant energy.

6. Apparatus for sensing the deviation in frequency of radiant energy from a predetermined value comprising Doppler radar means for generating a first analog quantity which is a function of both the magnitude of a physical quantity and the frequency of said energy, means for generating a second analog quantity which is indicative of the true magnitude of said physical quantity, and means for comparing said first and second analog quantities.

7. Apparatus for sensing the deviation in frequency of radiant energy from a predetermined value comprising, first Doppler radar means for generating a first analog quantity which is a function of both the magnitude of a physical quantity and the frequency of the radiant energy employed, second Doppler radar means for generating a second analog quantity which is indicative of the true magnitude of said physical quantity, and means for comparing said first and second analog quantities.

8. Apparatus for controlling the frequency of a source of wave energy comprising, first Doppler radar means employing energy from said source for generating a first analog quantity which is a function both of the frequency of said source and of one component of the velocity of a body, second Doppler radar means for generating a second analog quantity which is indicative of said component of velocity and is independent of the frequency of the wave energy employed, and means responsive to the difference between said analog quantities for controlling the frequency of said source.

9. Airborne apparatus for providing a source of microwave energy of substantially constant frequency comprising, a source of microwave energy, a first Doppler radar system utilizing said source for determining the horizontal component of the aircraft's velocity as a function of the frequency of said source, a second Doppler radar system for determining the horizontal component of the aircraft's velocity independently of the frequency of the energy transmitted, and means responsive to the difference in the two determinations for controlling the frequency of said source.

10. Apparatus of the class described comprising first and second airborne Doppler radar systems, each of said systems including means for transmitting a plurality of beams of microwave energy toward the earth and receiving a portion of the energy after reflection therefrom and each also including means for determining one component of aircraft velocity from the frequency of the returned energy, said first system being arranged so that the determination of said component is independent of the transmitted frequency, said second system being arranged so that the determination of said component is dependent upon the transmitted frequency, and means responsive to the difference between the two determinations of said component for controlling the frequency of the microwave energy transmitted by said second system.

11. In airborne navigation apparatus in which a first Doppler radar system determines a first component of aircraft velocity independently of the microwave frequency employed and in which a second Doppler radar system determines a second component of aircraft velocity independently of the microwave frequency employed, the improvement which comprises additional means associated with said second system for determining said first component of velocity by means dependent upon the frequency of said second system, and means responsive to the difference between the two determinations of said first component for controlling the frequency of the oscillations of said second system.

12. Airborne apparatus for automatically controlling the frequency of a microwave oscillator comprising, first means for transmitting pulses of microwave energy simultaneously from first and second linear array antennas, the beam from one array being directed forward and downward while the beam from the other array is directed aft and downward, one array being an in-phase array while the other array is an anti-phase array, first means associated with said first and second arrays for receiving pulse echoes after reflection from the earth, means for deriving therefrom a first signal indicative of the difference in frequency of the energy received by said first and second arrays, second means for transmitting pulses of microwave energy simultaneously from third and fourth linear array antennas, the beams being directed forward and downward and aft and downward respectively, said third and fourth linear arrays each being an in-phase array, second means associated with said third and fourth arrays for receiving pulse echoes after reflection from the earth, means for deriving therefrom a second signal indicative of the average of the Doppler shifts in frequency of the energy received by said third and fourth arrays, means for deriving a third signal indicative of the difference between said first and second signals, and means responsive to said third signal for controlling the frequency of the energy transmitted by said second transmitting means.

References Cited in the file of this patent
UNITED STATES PATENTS
2,740,294    Sanders  ---------------- Apr. 3, 1956